United States Patent
Daruwalla et al.

(10) Patent No.: US 11,568,374 B1
(45) Date of Patent: Jan. 31, 2023

(54) PREPAYMENT VALIDATION BY ORIGINATOR AND BENEFICIARY

(71) Applicant: Wells Fargo Bank, N.A., San Francisco, CA (US)

(72) Inventors: Jal Daruwalla, Chatham, NJ (US); Christopher Gliva, Somerdale, NJ (US); Ashia D. Kennon, Aston, PA (US); Lynnel J. Kresse, Ruskin, FL (US); Aravind Krishnasamy, San Ramon, CA (US); Marcia Osiecki, Delran, NJ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/908,463

(22) Filed: Jun. 22, 2020

Related U.S. Application Data

(63) Continuation of application No. 15/449,123, filed on Mar. 3, 2017, now Pat. No. 10,692,057.

(51) Int. Cl.
   *G06Q 20/10* (2012.01)
   *G06Q 40/04* (2012.01)

(52) U.S. Cl.
   CPC ............ *G06Q 20/10* (2013.01); *G06Q 40/04* (2013.01)

(58) Field of Classification Search
   CPC .... G06Q 20/40; G06Q 20/382; G06Q 20/401; G06Q 20/3674; H04M 15/68; H04W 12/06
   See application file for complete search history.

(56) References Cited

U.S. PATENT DOCUMENTS

| | | |
|---|---|---|
| 5,978,485 A | 11/1999 | Rosen |
| 7,765,136 B2 | 7/2010 | Northington et al. |
| 7,954,706 B2 | 6/2011 | Calabrese et al. |
| 8,504,470 B1 | 8/2013 | Chirehdast |
| 8,527,414 B2 | 9/2013 | Ross et al. |
| 8,725,605 B1 | 5/2014 | Plunkett |
| 8,924,289 B1 | 12/2014 | Knight et al. |
| 2001/0051878 A1 | 12/2001 | Yong |
| 2004/0243490 A1 | 12/2004 | Murto et al. |

(Continued)

FOREIGN PATENT DOCUMENTS

| | | |
|---|---|---|
| WO | WO-01/86546 A1 | 11/2001 |
| WO | WO-2008/130174 A1 | 10/2008 |

OTHER PUBLICATIONS

Bohme, Sascha; "Analysis of Bitcoin as a Peer-to-Peer Network for International Payments," Submitted to the System Design and Management Program on May 14, 2014. 72 pages.

*Primary Examiner* — Scott S Trotter
(74) *Attorney, Agent, or Firm* — Foley & Lardner LLP

(57) ABSTRACT

A method performed by a global transaction validation system includes receiving a transaction request from an originator, processing the transaction request by generating a data message containing the transaction data and by generating a notification message including at least part of the transaction data, transmitting the data message to the recipient financial institution, transmitting the notification message to a recipient device associated with the transaction recipient, receiving a return notification from the recipient device, and validating the transaction request based on the return notification indicating that the transaction is valid.

20 Claims, 3 Drawing Sheets

(56) References Cited

U.S. PATENT DOCUMENTS

| | | |
|---|---|---|
| 2004/0267666 A1 | 12/2004 | Minami et al. |
| 2005/0222952 A1 | 10/2005 | Garrett et al. |
| 2007/0005498 A1 | 1/2007 | Cataline et al. |
| 2010/0030675 A1 | 2/2010 | Hanan et al. |
| 2012/0066132 A1 | 3/2012 | Bates et al. |
| 2012/0179558 A1 | 7/2012 | Fischer |
| 2013/0060708 A1* | 3/2013 | Oskolkov .............. G06Q 20/10 705/75 |
| 2015/0142545 A1 | 5/2015 | Ceribelli et al. |
| 2015/0334108 A1 | 11/2015 | Khalil et al. |

\* cited by examiner

US 11,568,374 B1

PREPAYMENT VALIDATION BY ORIGINATOR AND BENEFICIARY

CROSS-REFERENCE TO RELATED PATENT APPLICATIONS

This application is a continuation of U.S. patent application Ser. No. 15/449,123, filed Mar. 3, 2017, now U.S. Pat. No. 10,692,057, the entire contents of which are hereby incorporated by reference.

BACKGROUND

When an originator of a financial transaction initiates a payment to a recipient, also known as a beneficiary, the payment must travel from a financial institution of the originator, where the payment is originated, to a financial institution of the recipient. The payment may also travel from the financial institution of the originator through one or more intermediary banks before reaching the financial institution of the recipient. This is especially true when an originator initiates a global payment to a foreign recipient. In such a case, it is typical for the foreign payment to travel through a plurality of intermediary banks located in different countries. For example, a payment originating in the United States with a final destination at a beneficiary bank in Kenya may travel from the originating bank to a first intermediate bank in the United Kingdom, then to a second intermediate bank in South Africa, then to a third intermediate bank in Kenya before reaching the beneficiary bank.

Each intermediate transfer may be subject to different government rules and regulations depending on which borders are being crossed as part of each transfer. Further, each intermediary bank typically charges a fee for their services. When initiating a global payment, the originator may enter insufficient information to satisfy government regulations of each county that the transaction passes through, or enter incorrect information, such as an incorrect payment amount owed to the beneficiary or directing the payment to the wrong beneficiary entirely. If insufficient or incorrect information is provided, the transaction can be returned up the chain of intermediate banks to the originator for repair, for example, for the provision of required information. If incorrect information is provided (e.g., an incorrect account of the beneficiary, an incorrect currency, or an incorrect amount of payment) but the beneficiary still receives the funds, the beneficiary may request that the originator send another payment to correct the deficiency. In these scenarios, delays and additional fees are typically added to the process.

SUMMARY

One embodiment relates to a computer-implemented method performed by a global transaction validation system. The method includes receiving a transaction request from an originator. The transaction request includes transaction data including one or more of originator account information, originator identification information, a transaction amount, a transaction recipient, and transaction recipient account information. The method further includes processing the transaction request by generating a data message containing the transaction data and by generating a notification message including at least part of the transaction data. The data message is configured to be readable by a recipient financial institution associated with the transaction recipient. The notification message is configured to be readable by a recipient device associated with the transaction recipient. The method further includes transmitting the data message to the recipient financial institution, transmitting the notification message to a recipient device associated with the transaction recipient, and receiving a return notification from the recipient device. The return notification includes an indication from the recipient regarding the at least part of the transaction data. The method further includes validating the transaction request based on the indication from the recipient.

Another embodiment relates to a system for processing global transactions. The system includes an originating financial institution computing system. The originating financial institution computing system is configured to receive a transaction request from an originator. The transaction request includes transaction data including one or more of originator account information, originator identification information, a transaction amount, a transaction recipient, and transaction recipient account information. The originating financial institution computing system is further configured to process the transaction request by generating a data message containing the transaction data and by generating a notification message including at least part of the transaction data. The data message is configured to be readable by a recipient financial institution associated with the transaction recipient. The notification message is configured to be readable by a recipient device associated with the transaction recipient. The originating financial institution computing system is further configured to transmit the data message to the recipient financial institution, transmit the notification message to a recipient device associated with the transaction recipient, and receive a return notification from the recipient device. The return notification includes an indication from the recipient regarding the at least part of the transaction data.

Another example embodiment relates to a non-transitory computer readable media having computer-executable instructions embodied therein that are executed by a global transaction processing circuit of an originating financial institution computing system. The instructions cause the global transaction processing circuit to perform operations. The operations include receiving, via a network interface circuit, a transaction request from an originator. The transaction request includes transaction data including one or more of originator account information, originator identification information, a transaction amount, a transaction recipient, and transaction recipient account information. The operations further include processing the transaction request by generating a data message containing the transaction data and by generating a notification message including at least part of the transaction data. The data message is configured to be readable by a recipient financial institution associated with the transaction recipient. The notification message is configured to be readable by a recipient device associated with the transaction recipient. The operations further include transmitting, via the network interface circuit, the data message to the recipient financial institution, transmitting, via the network interface circuit, the notification message to a recipient device associated with the transaction recipient, and receiving, via the network interface circuit, a return notification from the recipient device. The return notification includes an indication from the recipient regarding the at least part of the transaction data. The indication from the recipient is at least one of edited transaction data or flagged transaction data, or a validation of the transaction data received by the recipient device. The operations further include providing the return notification to an originator device associated with the originator. The return notification prompts the originator to at least one of validate the edited transaction data or edit the flagged transaction data. The operations further include validating the transaction request based on at least one of the indication from the recipient indicating that the transaction is valid or the originator validating the edited transaction data.

These and other features, together with the organization and manner of operation thereof, will become apparent from the following detailed description when taken in conjunction with the accompanying drawings.

DETAILED DESCRIPTION

Figure 1:
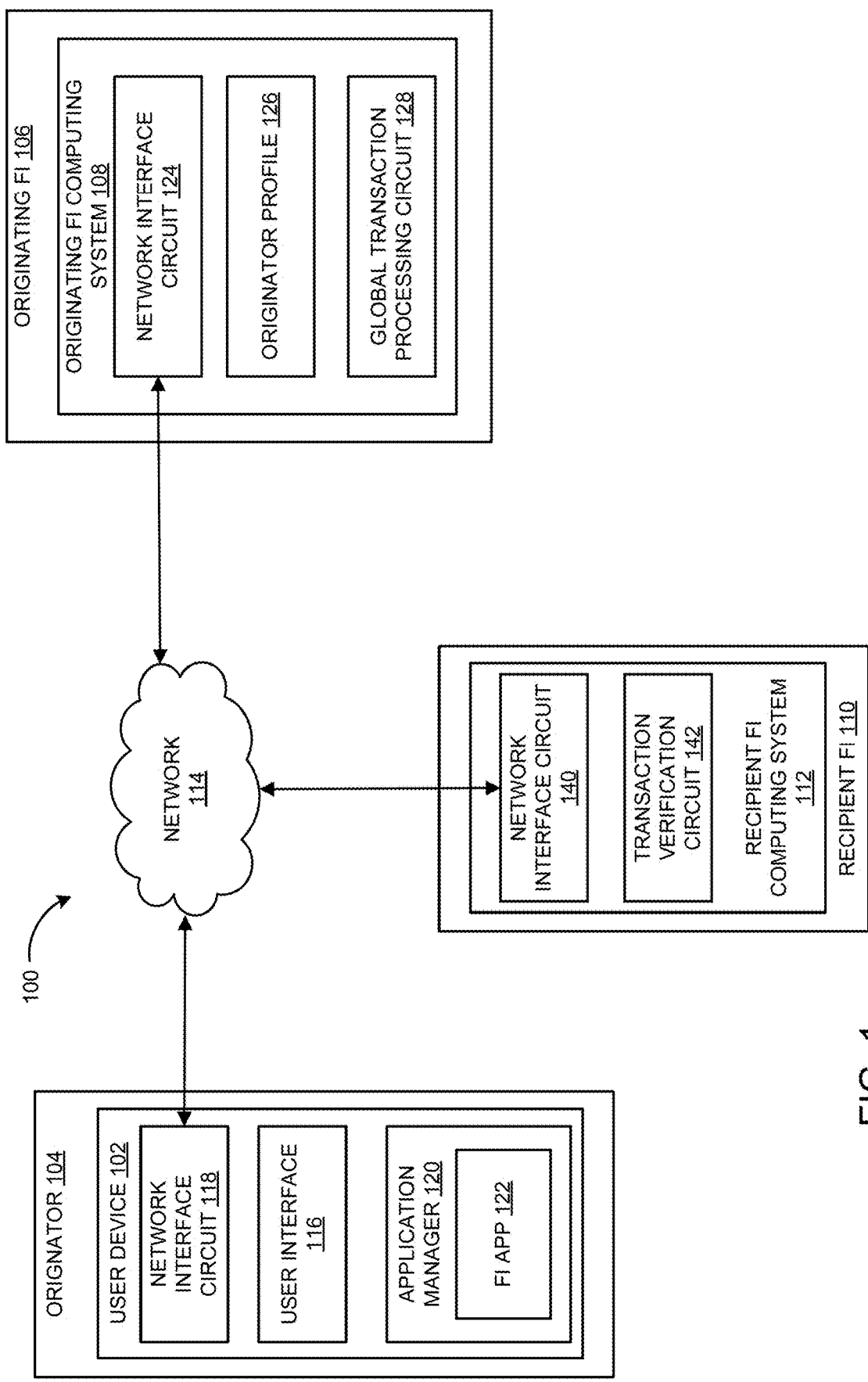
FIG. 1 is a block diagram of a global transaction validation system, according to an example embodiment.

Before turning to the figures which illustrate example embodiments, it should be understood that this application is not limited to the details or methodology set forth in the following description or illustrated in the figures. It should also be understood that the phraseology and terminology employed herein is for the purpose of description only and should not be regarded as limiting. For example, the embodiments of systems and methods discussed herein may be relevant to any of a variety of circumstances where validating financial transaction requests may be useful.

Referring generally to the figures, systems and methods for providing a global transaction validation system are shown according to various embodiments. According to various embodiments, a global transaction validation processing circuit associated with an originating financial institution ("FI") can receive a transaction request from a customer (e.g., an "originator") that specifies transaction data, such as originator account information, originator identification information, a transaction amount, a transaction recipient, and transaction recipient account information. The validation processing circuit processes the transaction request by generating a data message containing the transaction data and by generating a notification message including at least part of the transaction data. The validation processing circuit can transmit the data message to the recipient financial institution and transmit the notification message to a recipient device associated with the transaction recipient. The validation processing circuit further receives a return notification from the recipient device and the return notification includes an indication from the recipient regarding the at least part of the transaction data, and includes at least one of edited transaction data or flagged transaction data, or a validation of the transaction data received by the recipient device. The validation processing circuit provides the return notification to an originator device associated with the originator, and the return notification prompts the originator to at least one of validate the edited transaction data or edit the flagged transaction data. The validation processing circuit validates the transaction request based on at least one of the indication from the recipient indicating that the transaction is valid or the originator validating the edited transaction data.

The embodiments and implementations of the systems and methods disclosed herein improve current global transaction validation systems by improving the speed at which financial transactions can be validated, completed, and settled between financial institutions and originators and beneficiaries by providing faster validation of transaction requests by notifying recipients of initiated transaction requests and providing both originators and beneficiaries with the ability to quickly edit, or request editing, of the transaction request even after the transaction request is initiated without having to roll back the transaction request through intermediary banks for repair and correction or cancelling and reinitiating the transaction request. These embodiments accordingly reduce transaction failures by ensuring that complete and accurate information is provided to the parties of the transaction and their respective financial institutions. Further, by providing a status to each party, the parties can immediately realize what information was submitted as part of the transaction request and to identify any incorrect or deficient information before any problems arise (e.g., requirements needed for the transaction request to cross a country border to reach an intermediary bank or recipient bank). By providing editable information in such status requests or notifications, any party to a transaction request can provide any information needed to ensure that the transaction is completed without delay. Financial institutions may further ensure speedy validation by parties to the transaction by offering incentives, such as financial incentives, to parties that validate or correct information in a transaction request. These systems, methods, and computer implementations improve upon current financial transaction systems known in the art and solve the technical and computer-centric problem of providing a global transactional validation system that enables faster, easier, more accurate, and more reliable (e.g., completed a higher percentage of the time the first time the transaction is submitted) international transaction requests.

Referring now to FIG. 1, a block diagram of a global transaction validation system 100 is shown according to an example embodiment. The global transaction validation system 100 includes a user device 102 associated with a transaction originator 104. The originator 104 may be an individual or an entity, such as a corporation, FI, brokerage house, or any other entity that may initiate global transactions (e.g., a transfer of funds from an account at a FI in a first country to a recipient having an account at a FI in a second country). The global transaction validation system 100 further includes an originating FI 106 including an originating FI computing system 108, a recipient FI 110 including a recipient FI computing system 112, and a network 114. The user device 102, the originating FI computing system 108, and the recipient FI computing system 112 may each include a computer system (e.g., one or more servers, each with one or more processing circuits), each including a processor and a memory. As described herein, the originating FI 106 maintains at least one financial account in a first country, and the recipient FI 110 maintains at least one financial account in a second country different than the first country. Accordingly, as described herein, any transfer of funds between the originating FI 106 and the recipient FI 110 are international or global transfers. However, it will be appreciated that the inventive concepts of the present application could extend to a transfer of funds made between two financial institutions located in the same country.

The processors may be implemented as application specific integrated circuits (ASICs), one or more field programmable gate arrays (PFGAs), a group of processing components, or other suitable electronic processing components.

The memory may be one or more devices (e.g., RAM, ROM, Flash memory, hard disk storage, etc.) for storing data and/or computer code for completing and/or facilitating the various processes described herein. The memory may be or include non-transient volatile memory, non-volatile memory, and non-transitory computer storage media. The memory may include database components, object code components, script components, or any other type of information structure for supporting the various activities and information structures described herein. The memory may be communicably connected to the processor and include computer code or instructions for executing one or more processes described herein.

The originating FI computing system 108 and the recipient FI computing system 112 may include a server-based computing system, for example, comprising one or more networked computer servers programmed to perform the operations described herein. The originating FI computing system 108 and the recipient FI computing system 112 may be implemented as a distributed computer system, where some functions or each function is spread over multiple computer systems.

The originating FI computing system 108 and/or the recipient FI computing system 112 may be one or more centralized servers connected to one or more of the other listed components of the global transaction validation system 100 via the network 114. In some embodiments, the network 114 may be an internet-based network. For example, components of the global transaction validation system 100 may all be in communication with a cloud-based network, as described further herein. In some embodiments, the network connections between the components are wired network connections, such as a TCP/IP network. In some embodiments, the network connections may be facilitated via a wireless network, such as Wi-Fi, Wi-Max, cellular (3G, 4G, LTE, CDMA), LoRA, ZigBee, Near Field Communication ("NFC"), Bluetooth, or any other applicable wireless network protocols. In some embodiments, the originating FI computing system 108 and the recipient FI computing system 112 may be hosted by a third-party.

The recipient FI 110, includes a recipient FI computing system 112. The recipient FI computing system 112 includes a network interface circuit 140 and a transaction verification circuit 142. The network interface circuit 140 facilitates data communications to and from the network 114. The network interface circuit 140 is configured to communicate information with a recipient device via the network 114. The network interface circuit 140 may be configured to communicate wirelessly to the network 114, such as via Wi-Fi, Bluetooth, NFC, ZigBee, IR, RF, Cellular (3G, 4G, LTE, CDMA), etc. In some embodiments, the network interface circuit 140 may communicate with the network 114 via a wired connection, such as via Ethernet, a LAN, a WAN, Firewire, USB, or another applicable wired interface. In some embodiments, data passing through the network interface circuit 140 is encrypted. The transaction verification circuit 142 is configured to process a requested transaction received from the originating FI computing system 108. The transaction verification circuit 142 can evaluate the received requested transaction and verify that the transaction is valid.

The user device 102 may be any device associated with the originator 104 that can communicate with the network 114, and the originating FI 106. In some embodiments, the user device 102 may include a user interface on an internet accessible website. In some embodiments, the user device 102 may be a mobile device associated with the originator 104. Example mobile devices can include smartphones (e.g., iPhone®, Android® phones, Windows® phones, etc.), tablet computers (e.g., iPad®, Android® tablet, Microsoft Surface®, etc.), laptop computers, wearable devices, or any other device capable of communicating with the network 114 and the originating FI 106. In one embodiment, the user device 102 is used to provide access to the originating FI 106, including access to one or more interfaces or applications of the originating FI 106. The user device 102 may communicate with the originating FI 106 via the network 114.

The user device 102 includes a user interface 116, a network interface circuit 118, and an application manager 120. The user interface 116 may be any interface providing inputs and outputs to and from the user device 102. For example, the user interface 116 may be a touchscreen display associated with a mobile device, such as a smartphone or tablet PC. In another example, the user interface 116 may be a combination of a display and a separate input device, such as a keyboard. In another example, the user interface 116 may be an audio interface, such as a virtual assistant such as Apple's® Siri® or other virtual assistant device or application. The network interface circuit 118 is configured to facilitate data communications to and from the network 114. The network interface circuit 118 may be configured to communicate wirelessly with the network 114, such as via Wi-Fi, Bluetooth®, NFC, ZigBee, IR, RF, cellular (3G, 4G, LTE, CDMA), etc. In some embodiments, the network interface circuit 118 may communicate with the network 114 via a wired connection, such as via Ethernet, a LAN, a WAN, Firewire, USB, or another applicable wired interface. In some embodiments, data passing through the network interface circuit 118 is encrypted.

The application manager 120 is configured to manage one or more software applications (apps) associated with the user device 102. For example, the application manager 120 may manage an FI app 122. The FI app 122 may be a mobile banking application associated with a FI used by the originator 104, such as the originating FI 106. In one embodiment, the FI app 122 enables direct communication between the user device 102 and the originating FI 106. In another example, the FI app 122 may be a mobile wallet application. In one embodiment, the application manager 120 processes requests from the network interface circuit 118 to execute one or more applications. For example, the network interface circuit 118 may receive a request to open the FI app 122 to enable the originating FI 106 to interface or otherwise interact with the user device 102.

The originating FI computing system 108 is associated with the originating FI 106. The originating FI 106 may be a bank, a credit union, a brokerage house, a currency exchange, a governmental institution, or any other FI. The originating FI 106 is responsible for processing a transaction requested by the originator 104, such as a global financial transaction (e.g. a financial transaction with a recipient in a different country than the originator 104). In some embodiments, the originator 104 may have an account established with the originating FI 106. In some embodiments, the originator 104 may select the originating FI 106 for a specific transaction based on the ability of the originating FI 106 to complete the transaction. Example transactions can include payments, money transfers, currency exchanges, credit swaps, or other transactions requiring funds to be transferred to or from a recipient in a different country than the originator 104.

The originating FI computing system 108 is configured to process transaction requests presented to the originating FI 106. For example, the originating FI computing system 108 may process all global transactions associated with the originator 104. The originating FI computing system 108 may include a network interface circuit 124, an originator profile 126 and a global transaction processing circuit 128. The network interface circuit 124 is configured to facilitate data communications to and from the network 114. The network interface circuit 124 may be configured to communicate wirelessly with the network 114, such as via Wi-Fi, Bluetooth, NFC, ZigBee, IR, RF, cellular (3G, 4G, LTE, CDMA), etc. In some embodiments, the network interface circuit 124 may communicate with the network 114 via a wired connection, such as via Ethernet, a LAN, a WAN, Firewire, USB, or another applicable wired interface. In some embodiments, data passing through the network interface circuit 124 is encrypted.

The originator profile 126 may be configured to store a number of characteristics associated with the originator 104. For example, the originator profile 126 may be generated when the originator 104 opens an account with the originating FI 106. In some embodiments, the originator profile 126 may be dynamically created at the time the originator 104 requests to make a financial transaction. In one embodiment, the originator profile 126 may contain characteristics associated with the originator 104, such as personal identifying information (e.g., name, address, social security number, etc.), financial information (e.g., checking accounts, savings accounts, credit card accounts, money market accounts, etc.), asset information, previous transaction information, or any other information related to or required for the originator 104 and the originating FI 106 to interact with one another.

The global transaction processing circuit 128 is configured to process global transactions initiated by the originating FI 106. The global transaction processing circuit 128 is configured to process a transaction request. In some embodiments, the global transaction processing circuit 128 includes multiple sub-circuits used to perform aspects of a global transaction process.

The global transaction processing circuit 128 is configured to communicate with user device 102, recipient FI 110, a recipient user device, and intermediary financial institutions over the network 114 via the network interface circuit 124. The global transaction processing circuit 128 is configured to receive a transaction request from the originator 104 via the user device 102. The transaction request includes transaction data including one or more of originator account information (e.g., an originator account number), originator identification information, a transaction amount, a transaction recipient, and transaction recipient account information (e.g., a recipient account number).

The global transaction processing circuit 128 is configured to generate a data message containing the transaction data. The data message is configured to be readable by a recipient financial institution associated with the transaction recipient. The data message generation circuit 132 is configured to transmit the data message, via the network interface circuit 124, to the recipient financial institution. For example, the originating FI 106 may process the data from the transaction request such that the data is configured as a Society for Worldwide Interbank Financial Telecommunications (SWIFT) message. A SWIFT message can be used to direct the transaction message to the recipient FI 110 in a manner that the recipient FI 110 will be able to understand. In some examples, the data may be configured as a Telex message, a Fedwire message, a Ripple message, a CHIPS message, or any other message used for communicating transactions between the originating FI 106 and the recipient FI 110. Processing the request may further include authorizing a transfer of funds from an account associated with originator 104 to the recipient FI 110. Processing the request may further include determining a path to the recipient FI 110, via one or more intermediary financial institutions.

In some embodiments, communications from the originating FI 106 and the recipient FI 110 require the use of one or more intermediaries, particularly where the originating FI 106 and the recipient FI 110 are located in different countries and do not have an existing business relationship. The intermediaries may be institutions that have a business relationship with both the originating FI 106 and the recipient FI 110 (or between one of the originating FI 106 and the recipient FI 110 and one additional intermediary), and that can facilitate processing and completing the requested transaction between the originating FI 106 and the recipient FI 110. The intermediaries may be financial institutions, brokerage houses, third party transaction facilitators, government agencies, or other institutions that are capable of facilitating financial transactions between the originating FI 106 and the recipient FI 110. In some examples, multiple intermediaries may be required to facilitate delivery of a transaction request from the originating FI 106 to the recipient FI 110. In some instances, the intermediaries may also have specific information requests which the originating FI 106 will need to provide. The originating FI 106 may be aware of the information required to complete the transaction using intermediaries, and may require the originator 104 to provide additional information if needed as part of initiating the transaction request or via a return notification that the originator 104 receives from the recipient.

The global transaction processing circuit 128 is configured to generate a notification message including at least part of the transaction data. The notification message is configured to be readable by a recipient device associated with the transaction recipient. The transaction notification circuit 134 is configured to transmit the notification message, via the network interface circuit 124, to a recipient device associated with the transaction recipient. In some embodiments, the notification is configured to cause the recipient device to prompt the transaction recipient to validate the transaction request by confirming that the transaction data received by the recipient device is correct or acceptable to the recipient. For example, the notification can cause a pop-up message to appear on the recipient device that inquires whether the transaction data is correct. The notification may require an action by the recipient, such as confirming the transaction data, flagging transaction data, or editing transaction data. The notification may be configured to cause the recipient device to prompt the transaction recipient to validate the transaction request by confirming that the transaction data received by the recipient device is correct or acceptable to the recipient. In some embodiments, the notification requests the recipient to confirm an assumption made by the originator. For example, the notification can request the recipient to confirm that the recipient account can accept US dollars instead of a foreign currency, if for example, the recipient account is located in a country other than the United States. In some embodiments, the notification may prompt the recipient to open a type of account needed to accept the form of payment (e.g., indicating that the recipient must open an account capable of accepting Euros because the payment is in the form of Euros).

In some embodiments, the global transaction processing circuit 128 is configured to provide the notification message to the recipient via a recipient device over the network 114 without sending the notification message to the recipient financial institution 110. For example, if the originator 104 has sufficient contact information of the recipient, the originator 104 can provide direct contact information of the recipient as part of submitting the payment request. In this example, the notification may require the recipient to use a PIN number or password (established prior to initiation of the payment request) to access the transaction data. In another example, the notification may require the recipient to provide a detail of the payment request, such as information identifying the originator or the amount of the payment request, to authenticate the recipient before payment details are provided to the recipient as part of the notification. For example, upon receiving a payment notification, the payment notification may indicate the originator's identity and prompt the recipient to confirm the transaction amount before providing the recipient with the remainder of the transaction details under the assumption that if the recipient can correctly enter the correct transaction amount, then the recipient is actually the intended recipient and therefore they have authorization to view the payment details.

In some embodiments, the global transaction processing circuit 128 is configured to provide a return notification to an originator device associated with the originator. The return notification can prompt the originator to validate transaction data edited by the recipient or to edit the transaction data flagged by the recipient. For example, the return message from the recipient device may flag transaction data as being incorrect or otherwise needing correction. However, in some cases, the recipient may not know the correct information. Accordingly, the recipient may flag information as being incorrect and the originator may then correct the flagged information. For example, the recipient may flag the amount of payment if the payment amount is incorrect, or the recipient may be able to flag the currency for the transaction if the originator selected the wrong currently for the transaction. By flagging payment details, the recipient can request the originator to edit the payment information to make corrections.

The global transaction processing circuit 128 is configured to receive a return notification from a recipient device. The return notification includes an indication from the recipient regarding the at least part of the transaction data. The return notification received from the recipient device may provide edited transaction data, flagged transaction data, or a validation of the transaction data received by the recipient device. The indication from the recipient can be a validation of the transaction data conditioned on the originator making at least one edit to the transaction request (e.g., the transaction data is correct if the originator changes a specific part of the transaction data, such as an amount of the transaction, an account number, a currency selection). In some embodiments, the global transaction processing circuit 128 is configured to validate the transaction request in response to the originator approving edits that the recipient makes to the transaction request via the return notification. In some embodiments, the originator validates the transaction request by approving the edits made by the recipient after the payment request is being processed by the originating financial institution 106 and the recipient financial institution 110. The global transaction processing circuit 128 is configured to decline the transaction request if the originator 104 declines the edits made by the recipient as indicated by the return notification. In some embodiments, after receiving a return notification from a recipient device, the global transaction processing circuit 128 can cause the transaction request to proceed at a slower speed based on the return notification indicating that information in the transaction request is incorrect and requires repair.

The global transaction processing circuit 128 is configured to validate the transaction request. For example, the global transaction processing circuit 128 may validate the transaction request based on the indication of the return notification from the recipient indicating that the transaction is valid. In this way, the recipient can review the transaction data, and provide an indication to the global transaction processing circuit 128 that the transaction data is correct. In another example, the global transaction processing circuit 128 may validate the transaction request based on the originator validating the edited transaction data. Upon validating the transaction request, the transaction request is settled and the recipient gains access to the funds. In some embodiments, the global transaction processing circuit 128 places a hold on the funds until the recipient provides a return notification that they "accept" the details of the transaction request.

In some embodiments, the global transaction processing circuit 128 is configured to provide an incentive to the originator and the recipient. The incentive can encourage the originator and the recipient to validate, edit, or flag transaction request. The incentive can be a financial incentive (e.g., a set dollar amount, a percentage of the transaction amount). For example, the incentive may be provided to the originator and be conditioned on the originator validating the edited transaction data. In some embodiments, the incentive is time-based. For example, the incentive may be based on the originator or recipient taking an action within a time period. The time period may be based from when the transaction request was made, when a notification was sent or received, or when a return notification was sent or received. In some embodiments, the incentive may be a reduction in a fee, and may include a greater reduction of the fee for repairing the transaction more quickly. For example, the value of the incentive provided to the originator and recipient may decrease as time goes by.

In some embodiments, the notification message includes a status of the transaction request. The status can provide information to the originator and the recipient regarding a status of the transaction request. For example, the status can indicate an estimated time of completion of the transaction, a dollar amount of the transaction request, a delay, an event causing the delay, and at least one action that the originator and recipient can take to at least partially remedy the delay (e.g., such as validating the transaction request, correcting transaction data). In some embodiments, the notification including the status of the transaction may be provided to the user device 102 and the recipient device via email or via a text message or other electronic message deliverable to the user device 102 and the recipient device. The status may indicate when a transaction is initiated, and further include tracking information indicative of an estimated time that the payment request will be completed or settled. In some embodiments, the status may indicate estimated fees that will be incurred by the originator and recipient during the payment process. The estimated fees may be based on fees previously charged by the same intermediary financial institutions for similar types of transactions.

The global transaction processing circuit 128 can provide a status, via the network interface circuit 124, to both the originator 104 and the recipient. By providing a status to both the originator 104 and the recipient, both parties are made aware of the status of the transaction request and whether any information needs to be repaired for the transaction request to be processed further and settled or otherwise completed. For example, by providing the status to the originator 104 and the recipient, the originator 104 can view the transaction details to make sure all information is correct and the recipient can also review the transaction details and suggest changes for the originator 104 to accept. In this way, the originator 104 can view the payment details and repair the transaction without the transaction being returned up the chain of intermediate banks and stalling the transaction.

For example, the status may indicate that the payment request is missing required information, such as a "purpose of payment," which may be required in some jurisdictions. The status may indicate that the payment is delayed due to missing information and prompt the originator and beneficiary to provide the "purpose of payment" for the transaction to continue to be processed. In some embodiments, the status provides a confidence score indicating how likely the payment is to be completed or settled on time.

For example, after the payment request is received by the first intermediary financial institution, the first intermediary financial institution identifies that insufficient information has been provided for the fourth intermediary financial institution. Instead of sending the payment back to the originating financial institution for repair, the first intermediary financial institution sends the transaction on to the third intermediary financial institution and provides a notification to the originator 104 and recipient so that they can repair the transaction before the transaction reaches the fourth intermediary bank, where the transaction request will become stalled if the transaction request has insufficient information.

In some embodiments, the global transaction processing circuit 128 is configured to first transmit the data message to an intermediary financial institution before the data message is transmitted to the recipient financial institution. For example, the global transaction processing circuit 128 can transmit the data message to a first intermediary financial institution that interprets the data message and sends the data message or a first modified data message to a second intermediary financial institution that interprets the data message or first modified data message and sends the data message, the first modified data message, or a second modified data message to an additional intermediary financial institution, and so on until the data message, first modified data message, or second modified data message reaches the recipient FI computing system 112.

In some embodiments, the global transaction processing circuit 128 is configured to first transmit the notification message to an intermediary financial institution before transmitting the notification message to the recipient device. Similar to the path of the data message, intermediary financial institutions can relay the notification message or a modified notification message to additional intermediary financial institutions that then transmit the notification message or the modified notification message to the recipient financial institution 110 or the recipient device.

In some embodiments, the notification message is configured to cause the return notification to be directly sent from the recipient device via the network 114 to the originating FI 106 and to the user device 102 associated with the originator without the return notification first being transmitted to an intermediary financial institution. In this way, the return notification is provided to the originating FI 106 and the user device 102 as fast as possible without any delays resulting from the return notification potentially traveling through several layers of intermediary financial institutions.

Figure 2:
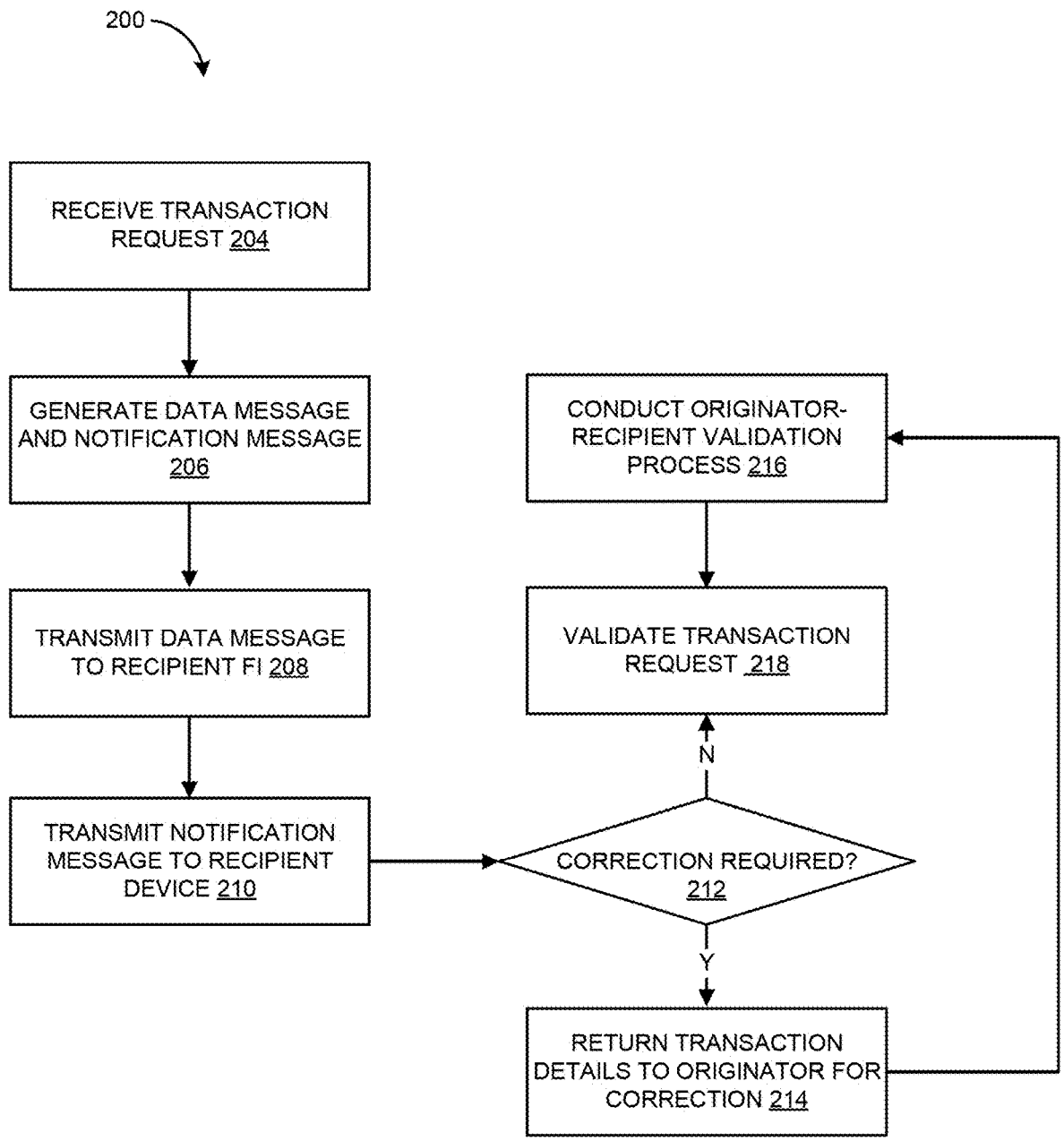
FIG. 2 is a flow diagram illustrating a global transaction validation method, according to an example embodiment.

FIG. 2 is a flow diagram illustrating a global transaction validation method 200, according to an example embodiment. For clarity and brevity, the method 200 is discussed with respect to the system of FIG. 1. The method 200 can be performed by the originating FI computing system 108.

The method 200 begins when the originating FI computing system 108 receives a transaction request at 204. In one example, the originator 104 enters transaction details that are provided to the originating FI computing system 108. In one embodiment, the originator 104 enters the transaction details via the user device 102. For example, the originator 104 may enter the transaction details to initiate the transaction request via the FI app 122 on their mobile device. In some embodiments, the FI app 122 is configured to provide a form based on the transaction type for the customer to complete to initiate the transaction request. In some embodiments, the originator 104 enters the transaction using an interface on a banking device, such as an automatic teller machine (ATM) or an automatic banking machine. The originator 104 provides transaction data such as originator identity information, transaction specific information (e.g. transaction amount, accounts, etc.), and recipient specific information, such as recipient identification, recipient location, recipient email address, and so on, as part of initiating the transaction request.

The originator 104 transmits the transaction request to the originating FI 106. In one embodiment, the originator 104 can transmit the request via the user device 102. For example, the originator 104 may transmit the request to the originating FI 106 via the FI app 122. After receiving the transaction request at 204, the originating FI 106 processes the transaction request by generating a data message and a notification message at 206. The data message contains the transaction data and the notification message includes at least part of the transaction data. The data message is configured to be readable by a recipient financial institution, such as recipient FI 110, associated with the transaction recipient. In some embodiments, the data message contains all information necessary for the recipient FI 110 to process the transaction request and all information necessary for an intermediary financial institution to relay the transaction request to the recipient FI 110. The notification message is configured to be readable by a recipient device associated with the transaction recipient. The notification message does not need to contain all information necessary for the recipient FI 110 to process the transaction request because the notification message is intended to provide details of the transaction request to the recipient of the transaction request for review, correction, and validation.

The method 200 further includes transmitting the data message to the recipient FI 110 at 208. In some embodiments, transmitting the data message to the recipient FI 110 includes first transmitting the data message to an intermediary financial institution that then transmits the data message or a modified data message to another intermediary financial institution or the recipient FI 110.

The method 200 further includes transmitting the notification message to a recipient device associated with the transaction recipient at 210. In some embodiments, transmitting the notification message to the recipient device includes first transmitting the notification message to an intermediary financial institution that then transmits the notification message or a modified notification message to another intermediary financial institution, the recipient device, or the recipient FI 110. In some embodiments, the recipient FI 110 relays the notification message to the recipient device. In some embodiments, the global transaction processing circuit 128 transmits the notification message to the recipient device via the network interface circuit 124 and the network 114 without the notification message being routed through an intermediary financial institution or the recipient FI 110 (e.g., in the case where the originator 104 has contact information of the recipient, such as an email address or phone number).

The method 200 further includes determining whether the transaction data requires correction at 212. Determining whether the transaction data requires correction is based on a return notification received from the recipient device. The return notification includes an indication from the recipient regarding at least part of the transaction data and is provided to the global transaction processing circuit 128. For example, if the return notification from the recipient indicates that the transaction details are correct, the transaction is validated. For example, in response to the recipient validating the transaction details, the return notification is received at the originating FI 106, at an intermediary financial institution, or at the recipient FI 110, and the transaction is validated accordingly. For example, if the return notification is received at the originating FI 106, the global transaction processing circuit 128 can validate the transaction request and transmit a second data message to the recipient FI 110, via any number of intermediary financial institutions, indicating that the transaction request has been validated.

In some embodiments, the indication received from the recipient includes edited transaction data or flagged transaction data. In this case, the transaction details are returned to the originator for correction at 214. The edited transaction data may include transaction data corrected by the recipient. For example, the return notification may indicate that at least part of the transaction data is incorrect and provide the corrected transaction data. For example, the return notification may indicate that the payment amount is incorrect and provide the corrected payment amount. If the recipient edits or flags the transaction data, a return notification is provided to an originator device associated with the originator.

The method 200 further includes conducting an originator-recipient validation process at 216. The return notification provided to the originator device is configured to prompt the originator to validate the edited transaction data or edit the flagged transaction data. If the originator edits the flagged transaction data, an additional notification message is provided to the recipient, and the back-and-forth process continues until both the originator and recipient agree to the accuracy of the transaction data.

If the originator validates transaction data that was edited by the recipient, then the back-and-forth process concludes with that particular transaction request being validated at 218. An indicated of the transaction request being validated is received at the originating FI 106, the recipient FI 110, or an intermediary financial institution. For example, the indication of the transaction request being validated can "catch up" to the original transaction request data message so that once the transaction data message reaches the recipient FI 110, the transaction request is settled. Validation of the transaction request is based on both the originator 104 and the recipient agreeing or otherwise approving (e.g., indicating that the details of the transaction request are accurate) to the details of the transaction request (e.g., either receiving an indication from the recipient at 212 that the original transaction request is valid or after a back-and-forth process at 216). However, it will be appreciated that validating the transaction request can include additional steps and considerations, such as authenticating the identity of the recipient and determining that the originator has sufficient funds or credit to fulfill the transaction request.

Figure 3:
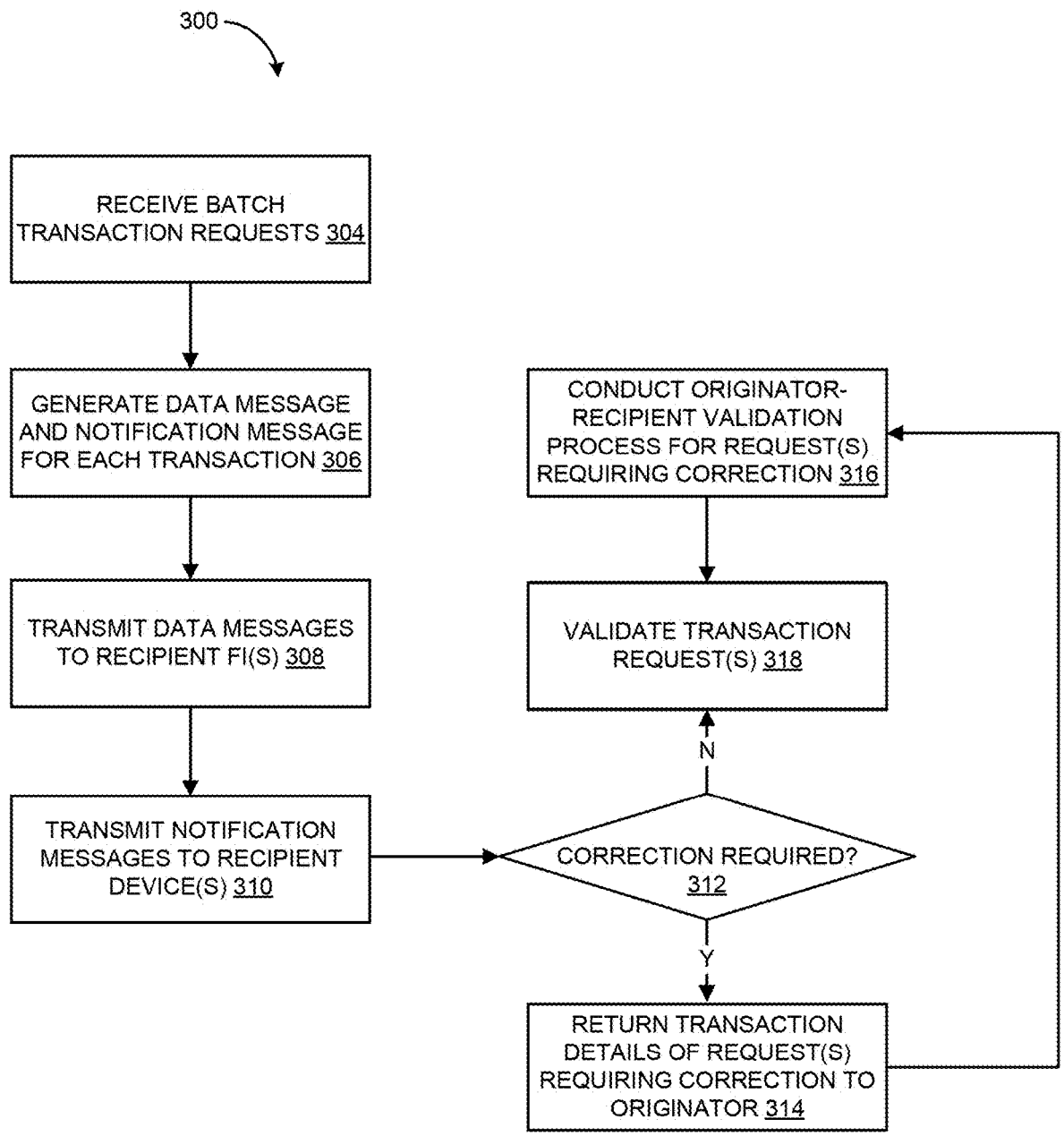
FIG. 3 is a flow diagram illustrating a global transaction validation method for processing batch transactions, according to an example embodiment.

FIG. 3 is a flow diagram illustrating a global transaction validation method 300 for processing batch transactions, according to an example embodiment. For clarity and brevity, the method 300 is discussed with respect to the system of FIG. 1. The method 300 can be performed by the originating FI computing system 108.

The originating FI 106 receives a batch of transaction requests at 304. The originator 104 may enter a batch of transaction requests. For example, the originator 104 may submit a number of payments to for paying various invoices or other bills. In some examples, the originator 104 may submit multiple fund transfers at one time. In one embodiment, the originator 104 may enter multiple transaction requests via the user device 102 as a batch transaction request. For example, the originator 104 may enter the transaction requests via the FI app 122. In some embodiments, the originator 104 may upload the transaction requests to the originating FI 106 as a single file (e.g., a single file containing information relating to multiple discrete transactions). In some embodiments, the transaction requests may be entered into the originating FI 106, such as via the FI app 122, one at a time, and then submitted together once all the transaction requests have been entered. In some embodiments, the FI app 122 may be configured to provide a form based on the transaction type for the originator 104 to complete to initiate a transaction request. The originator 104 may provide transaction data such as originator identity information, transaction specific information, and recipient specific information, as described herein, within the form to generate the transaction request. In some embodiments, the originator 104 may provide basic transaction data associated with each of the transaction requests.

The originator 104 can transmit the transaction requests to the originating FI 106. In one embodiment, the originator 104 can transmit the transaction requests via the user device 102. For example, the originator 104 may transmit the transaction requests to the originating FI 106 via the FI app 122. After receiving the transaction requests at 304, the originating FI 106 processes the transaction requests by generating a data message for each transaction request and a notification message for each transaction request at 306. The data messages contain the transaction data for each transaction request and the notification messages includes at least part of the transaction data of each transaction request. The data messages are configured to be readable by a recipient financial institution, such as recipient FI 110, associated with the transaction recipient. In some embodiments, the data messages contain all information necessary for the recipient FI 110 to process the transaction requests and all information necessary for an intermediary financial institution to relay the transaction requests to the recipient FI 110. The notification messages are configured to be readable by a recipient device associated with the transaction recipient. The notification messages do not need to contain all information necessary for the recipient FI 110 to process the transaction requests because each notification message is intended to provide details of a respective transaction request to the recipient of the transaction request for review, correction, and validation.

The method 300 further includes transmitting the data messages to the recipient FI 110 at 308. In some embodiments, transmitting the data messages to the recipient FI 110 includes first transmitting the data messages to an intermediary financial institution that then transmits the data messages or modified data messages to another intermediary financial institution or the recipient FI 110. When processing batch transaction requests, data messages may be transmitted to several recipient financial institutions and several intermediary financial institutions as the transaction requests may be intended for different recipients or for different accounts associated with the same recipient.

The method 300 further includes transmitting the notification messages to recipient devices associated with the transaction recipients at 310. In some embodiments, transmitting the notification messages to the recipient devices includes first transmitting the notification messages to intermediary financial institutions that then transmit the notification messages or modified notification messages to other intermediary financial institutions, recipient devices, or the recipient financial institutions. In some embodiments, the recipient financial institutions relay the notification messages to the recipient devices. In some embodiments, the global transaction processing circuit 128 transmits the notification messages to recipient devices via the network interface circuit 124 and the network 114 without the notification messages being routed through an intermediary financial institution or a recipient financial institution (e.g., in the case where the originator 104 has contact information of the recipients, such as an email addresses or phone numbers).

The method 300 further includes determining whether the transaction data of the batch transaction requests require correction at 312. Determining whether transaction data requires correction is based on a return notification received from the recipient device for each transaction request. The return notification includes an indication from the recipient regarding at least part of the transaction data and is provided to the global transaction processing circuit 128. For example, if the return notification from the recipient for a given transaction request of the batch transaction requests indicates that the transaction details are correct, the transaction is validated at 318. For example, in response to the recipient validating the transaction details of a given transaction request of the batch transaction requests, the return notification is received at the originating FI 106, at an intermediary financial institution, or at the recipient FI 110, and the transaction is validated accordingly. For example, if the return notification for a given transaction request of the batch transaction requests is received at the originating FI 106, the global transaction processing circuit 128 can validate the transaction request and transmit a second data message to the recipient FI 110, via any number of intermediary financial institutions, indicating that the transaction request has been validated.

In some embodiments, the indication received from the recipient for a given transaction request of the batch transaction requests includes edited transaction data or flagged transaction data. In this case, the transaction details of the particular transaction request are returned to the originator for correction at 314. The edited transaction data may include transaction data corrected by the recipient. For example, the return notification may indicate that at least part of the transaction data for a given transaction request of the batch transaction requests is incorrect and provide the corrected transaction data. For example, the return notification may indicate that the payment amount is incorrect and provide the corrected payment amount. If the recipient edits or flags the transaction data, a return notification for this transaction request of the batch transaction requests is provided to an originator device associated with the originator.

The method 300 further includes conducting an originator-recipient validation process for any transaction requests of the batch transaction requests that are indicated to not be correct by the recipient at 316. A return notification indicating that a particular transaction request of the batch transaction requests is incorrect is provided to the originator device and is configured to prompt the originator to validate transaction data edited by the recipient or to edit transaction data flagged by the recipient as being incorrect. If the originator edits the flagged transaction data, an additional notification message is provided to the recipient, and the back-and-forth process continues until both the originator and recipient agree to the accuracy of the transaction data.

If the originator validates transaction data that was edited by the recipient, then the back-and-forth process concludes with that particular transaction request being validated at 318. An indication of the particular transaction request being validated is then received at the originating FI 106, the recipient FI 110, or an intermediary financial institution. For example, the indication of the transaction request being validated can "catch up" to the original transaction request data message so that once the transaction data message reaches the recipient FI 110, the transaction request is settled. Validation of the particular transaction request is based on both the originator 104 and the recipient agreeing or otherwise approving (e.g., indicating that the details of the particular transaction request are accurate) to the details of the particular transaction request (e.g., either receiving an indication from the recipient at 212 that the original transaction request is valid or after a back-and-forth process at 316). However, it will be appreciated that validating each particular transaction request can include additional steps and considerations, such as authenticating the identity of the recipients and determining that the originator has sufficient funds or credit to fulfill each transaction request.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more dedicated processors may execute instructions stored in the dedicated memory or may execute instructions otherwise accessible to the one or more dedicated processors. In some embodiments, the one or more dedicated processors may be embodied in various ways. The one or more dedicated processors may be constructed in a manner sufficient to perform at least the operations described herein. In some embodiments, the one or more dedicated processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more dedicated processors may be structured to perform or otherwise execute certain operations independent of one or more co-processors. In some example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more dedicated processors may take the form of a single core processor, multi-core processor (e.g., a dual core processor, triple core processor, quad core processor, etc.), microprocessor, etc.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method performed by a global transaction validation system, the method comprising:

receiving a transaction request from an originator, the transaction request comprising transaction data including one or more of originator account information, originator identification information, a transaction amount, a transaction recipient, and transaction recipient account information;

processing the transaction request by generating a notification message including a status and at least part of the transaction data, the notification message configured to be readable by a recipient device associated with the transaction recipient, wherein the at least part of the transaction data comprises editable data required for a transaction and the status comprises an indication regarding a potential delay related to the editable data;

transmitting the notification message to the recipient device associated with the transaction recipient;

receiving a return notification from the recipient device, the return notification including an indication from the recipient device regarding the at least part of the transaction data, wherein the at least part of the transaction data is associated with the transaction request held by a recipient financial institution associated with the transaction recipient, wherein the indication from the recipient device is a change to the editable data required for the transaction that remedies the potential delay by correcting the editable data required for the transaction, and wherein the return notification is transmitted from the recipient device to at least one of a financial institution of the originator or an originator device associated with the originator without first being transmitted to an intermediary financial institution; and validating the transaction request based on the indication from the recipient device.

2. The computer-implemented method of claim 1, wherein validating the transaction request is based on the indication from the recipient device indicating that the transaction is valid.

3. The computer-implemented method of claim 1, wherein the indication from the recipient device includes a validation of part of the transaction data received by the recipient device.

4. The computer-implemented method of claim 3, the method further comprising providing the return notification to the originator device associated with the originator, the return notification prompting the originator to at least one of validate the edited transaction data or edit flagged transaction data.

5. The computer-implemented method of claim 4, the method further comprising validating the transaction request based on the originator validating the edited transaction data.

6. The computer-implemented method of claim 4, the method further comprising providing an incentive to the originator conditioned on the originator validating the edited transaction data, wherein the incentive is a financial incentive.

7. The computer-implemented method of claim 1, wherein the indication from the recipient device includes a validation of part of the transaction data conditioned on the originator making at least one edit to the part of the transaction data.

8. The computer-implemented method of claim 1, wherein the notification message causes the recipient device to prompt the transaction recipient to validate the transaction request by confirming that the transaction data received by the recipient device is correct or acceptable to the recipient and in response to the recipient validating the transaction request, providing at least one of a financial incentive and a time-based incentive to the recipient.

9. The computer-implemented method of claim 1, wherein the notification message includes a status of the transaction request, and wherein transmitting the notification message includes transmitting the notification message to the originator device associated with the originator of the transaction request, wherein the status indicates at least one of an estimated time of completion of the transaction, a dollar amount of the transaction request, a delay, an event causing the delay, and at least one action that at least one of the originator or recipient can take to at least partially remedy the delay.

10. The computer-implemented method of claim 1, wherein the method further includes transmitting a data message to the recipient financial institution including the transaction data, wherein transmitting the data message to the recipient financial institution includes first transmitting the data message to the intermediary financial institution, the intermediary financial institution then transmitting the data message or modifying and then transmitting the data message to the recipient device or to the recipient financial institution.

11. A system for processing global transactions, the system comprising:
an originating financial institution computing system, the originating financial institution computing system configured to:
receive a transaction request from an originator, the transaction request comprising transaction data including one or more of originator account information, originator identification information, a transaction amount, a transaction recipient, and transaction recipient account information;
process the transaction request by generating a notification message including a status and at least part of the transaction data, the notification message configured to be readable by a recipient device associated with the transaction recipient, wherein the at least part of the transaction data comprises editable data required for a transaction and the status comprises an indication regarding a potential delay related to the editable data;
transmit the notification message to the recipient device associated with the transaction recipient; and
receive a return notification from the recipient device, the return notification including an indication from the recipient device regarding the at least part of the transaction data, wherein the at least part of the transaction data is associated with the transaction request held by a recipient financial institution associated with the transaction recipient,
wherein the indication is a change to the editable data required for the transaction that remedies the potential delay by correcting the editable data required for the transaction, and
wherein the return notification is transmitted from the recipient device to at least one of a financial institution of the originator or an originator device without first being transmitted to an intermediary financial institution.

12. The system of claim 11, the originating financial institution computing system further configured to validate the transaction request based on the indication from the recipient device indicating that the transaction is valid.

13. The system of claim 11, wherein the indication from the recipient device includes a validation of part of the transaction data received by the recipient device.

14. The system of claim 13, wherein the notification message causes the recipient device to prompt the transaction recipient to validate the transaction request by confirming that the transaction data received by the recipient device is correct or acceptable to the recipient.

15. The system of claim 14, the originating financial institution computing system further configured to provide an incentive to the recipient conditioned on the recipient validating the transaction request.

16. The system of claim 15, wherein the incentive is at least one of a financial incentive and a time-based incentive.

17. The system of claim 11, wherein the notification message includes a status of the transaction request, and wherein transmitting the notification message includes transmitting the notification message to the originator device associated with the originator of the transaction request.

18. The system of claim 17, the status indicating at least one of an estimated time of completion of the transaction, a dollar amount of the transaction request, a delay, an event causing the delay, and at least one action that at least one of the originator or recipient can take to at least partially remedy the delay.

19. A non-transitory computer readable media having computer-executable instructions embodied therein that, when executed by a global transaction processing circuit of an originating financial institution computing system, causes the global transaction processing circuit to perform operations, the operations comprising:
receiving a transaction request from an originator, the transaction request comprising transaction data including one or more of originator account information, originator identification information, a transaction amount, a transaction recipient, and transaction recipient account information;
processing the transaction request by generating a notification message including a status and at least part of the transaction data, the notification message configured to be readable by a recipient device associated with the transaction recipient, wherein the at least part of the transaction data comprises editable data required for a transaction and the status comprises an indication regarding a potential delay related to the editable data;
transmitting the notification message to the recipient device associated with the transaction recipient;
receiving a return notification from the recipient device, the return notification including an indication from the recipient device regarding the at least part of the transaction data, wherein the at least part of the transaction data is associated with the transaction request held by a recipient financial institution associated with the transaction recipient,
wherein the indication from the recipient device is a change to the editable data required for the transaction that remedies the potential delay by correcting the editable data required for the transaction, and
wherein the return notification is transmitted from the recipient device to at least one of a financial institution of the originator or an originator device without first being transmitted to an intermediary financial institution; and
validating the transaction request based on the indication from the recipient device.

20. The non-transitory computer readable media of claim 19, wherein the indication from the recipient device includes a validation of part of the transaction data received by the recipient device.

* * * * *